Patented Apr. 23, 1929.

1,710,343

UNITED STATES PATENT OFFICE.

HUGH HARLEY CANNON, OF LOS ANGELES, CALIFORNIA.

METHOD OF FILTERING LIQUIDS.

No Drawing. Application filed June 30, 1928. Serial No. 289,618.

The subject matter of my invention is that type of filtration in which a cake or layer of a permeable solid, such for instance as a finely ground clay or earth, is formed on a foraminous medium, such as the cloth in a filter press or on the bottom of a percolator, and a liquid is thereafter passed through the cake in order to produce a desired effect either on the solid matter of the cake or on the liquid. My invention does not concern that more common type of filtration in which a mixture of a comminuted solid with a liquid is brought into pressureal contact with a foraminous medium for the mere separation of the liquid from the solid.

An example of the type of filtration in which the desired effect is the purifying or cleaning of the solid is found in the washing of filter cakes formed in the treatment of lubricating oils with clay. The filtration of the clay-oil mixture leaves in the press a cake containing a valuable quantity of viscous lubricating oil. Such cakes are washed to separate the lubricant from the clay, both being of value when separated, while the wash liquid is recovered unchanged.

An example of the type of filtration in which the desired effect is the purification of a liquid, or the production of a chemical change therein, is found in the treatment of petroleum distillates with cakes of porous earth mixed or impregnated with caustic soda or other chemicals which react with certain constituents of the oil to remove therefrom acids or sulfur compounds. In this example the press cake is not the residual from a previous treatment but is formed in the press or other filtration mechanism for the definite purpose of treating the oil which is afterwards forced through it.

In either of these examples, and in others to which my invention applies, the press cake contains, in addition to the clay or earth of which it is primarily composed, a substantial proportion of some other substance which adds to its bulk. In the first example this other substance is viscous lubricating oil, entrained between the clay grains and holding them at a substantial distance from each other. In the second example this other substance is a reactive chemical in solid form, interspersed between or coating the clay or earth grains and, again, preventing them from coming into complete contact.

In either example the effect of passing a suitable liquid through the cake is to remove a substantial part or all of the substance by which the cake is distended, and by such removal to diminish its bulk. In the first example the passage of wash naphtha through the cake removes the viscous lubricating oil and replaces it with a nonviscous naphtha, thus permitting the earth grains to approach each other more closely or to come into actual contact. In the second example the same result is produced by the combination of the chemical and its continuous removal as a liquid reaction product.

The material of which clay or earth press cakes is composed will not flow under pressure, and in consequence a removal of the distending substance, of whatever nature, and the reduction in bulk which follows from such removal, sets up a shrinkage of the cake. In so far as this shrinkage occurs in a direction at right angles to the plane of the cake, that is, in so far as the thickness of the cake is diminished, the shrinkage is innocuous and without effect on the further functioning of the washing or treating step, as the case may be. But shrinkage is not confined to diminution of thickness, but takes place in all three directions, and where there is a material degree of shrinkage parallel to the plane of the cloth, cracks open up in the material of the cake, these cracks starting at the intake face of the cloth and rapidly penetrating the cake and exposing narrow lines of cloth to the liquid. As the resistance to flow of the cloth itself is but a small fraction of the resistance set up by the material of the cake, the wash liquid or the liquid being treated will pass through these cracks in preference to passing through the cake material, and the extraction of oil, from the cake or the treatment of liquid by chemicals contained in it will come to an end.

This phenomenon, well known to all who have attempted to wash lubricating oil cakes in the press, has heretofore prevented washing or treatment in this very simple and desirable manner. I have found that shrinkage may be counteracted and a complete extraction of the soluble matter in the cake thus made possible, by the simple manipulation about to be described.

Assuming the cake to be already formed, that is, that spent cake containing, for example, lubricating oil remains in the press and is to be washed, or that a fresh cake containing a reactive chemical is formed in the press in any convenient manner and is ready for the treatment of a liquid, I proceed to pass through it an appropriate liquid under a suitable pressure. In the case of a lubricating oil cake such liquid might be a light petroleum naphtha or other solvent for viscous lubricants. In the case of a chemical cake the appropriate liquid would be the liquid to be treated by the chemical, such as gasoline or cracked naphtha, kerosene, lubricating distillate or other petroleum product, or it might be an aqueous solution containing ingredients reactive with the particular chemical with which the cake is impregnated. An appropriate pressure is one which will produce a desired rate of filtration or percolation of the liquid through the cake, and will vary indefinitely with the characteristics of the cake and of the liquid.

As soon as a small quantity of liquid has passed through the cake a diminution of volume will take place, and the cake will tend to shrink and crack. To offset this effect and to keep the cake healed and of even thickness and permeability in all parts I introduce into the entering stream of liquid a minute and substantially continuous supply of the particular earthy material of which the cake is composed: the particular kind of clay used in previous treatment of the oil, in the case of a lubricating oil cake, or the particular mixture of earth and chemical used in forming up the original chemical cake.

This finely pulverized solid material entering the press along with the otherwise clear liquid will be to some extent deposited on the entire surface of the cake, but as soon as shrinkage manifests itself in the form of an insipient crack an excess quantity of the liquid will be drawn into such crack and, as the earthy matter cannot pass through the cloth it will be deposited in the crack and will thus fill and heal it as fast as it opens. Thus while the actual shrinkage of the cake is in nowise prevented or even retarded, the formation of cracks which is the undesirable result of shrinkage is entirely prevented and an even pressure may be maintained on all parts of the cake which will remain of a constant degree of permeability throughout its entire area. The liquid is thus prevented from short-circuiting through cracks or channels and the passage of liquid through the whole of the cake until the oil is completely washed out or until the chemical is completely exhausted.

The quantity of solid matter to be introduced into the liquid to obtain this effect will vary with the nature of the cake as regards its tendency to shrink. The quantity will be greater than the actual shrinkage in any case, as a portion of the solid matter will be evenly deposited over the entire surface of the cake, but the quantity will be much less than the volume of the cake. In ordinary cases a supply of solid equal to from 5% to 10% of the solid contained in the original cake will be quite sufficient to prevent cracking.

The solid matter required for this purpose may be introduced into the entering stream of liquid in any convenient manner. Thus, it may be intermixed with the total volume of liquid to be put through the press, where this volume can be segregated as a batch, but in such case it must be kept in suspension in the liquid as by continuous agitation so that it will pass into the press in substantially constant proportion to the liquid feed. It may also be fed in the form of a powder into a small tank or mixer into which flows a stream of liquid sufficient to supply the press feed pump. I prefer, however, to mix the entire quantity to a smooth cream with the minimum quantity of the liquid to be fed to the press, and to feed this thick suspension into the stream of liquid in measured proportion on the suction side of the feed pump, thus securing even distribution and sufficiently complete admixture with the liquid.

In the case of chemical cakes the introduction of a portion of fresh chemical powder into the press feed leads to no waste of material, as it is simply added to the quantity of reactive material originally placed in the press and is used to the same advantage. In case the cakes were merely being washed, however, the introduction of fresh clay would be wasteful, as this clay would serve no purpose in decolorizing or purifying the wash naphtha. In such cases, therefore, I prefer to introduce a powder consisting of spent washed and dried clay recovered from the washing of a previous cake, and which is usually of little value, the object of the washing operation being usually the recovery of oil values rather than of clay values.

I claim as my invention:

1. A method of extracting entrained matter from filter cakes, comprising: passing through said cake a solvent for the entrained matter, and introducing with said solvent a finely pulverized insoluble material in quantity sufficient to fill shrinkage cracks formed in said cake by the withdrawal of said entrained matter by said solvent.

2. A method of extracting entrained matter from filter cakes, comprising: passing through said cake a solvent for the entrained matter, and introducing with said solvent a pulverized material substantially identical with the insoluble constituent of said cake.

3. A method of treating a liquid with a cake of pulverized inert material containing a chemical reactive with constituents of said liquid, comprising: passing said liquid through said cake and introducing with said liquid a further supply of the material of which the cake is composed.

4. A method of treating a liquid with a cake of pulverized inert material containing a chemical reactive with constituents of said liquid, comprising: passing said liquid through said cake and introducing with said liquid a supply of the inert ingredient of the cake.

5. A method of treating a liquid with a pulverized mixture of inert material and material reactive with constituents of said liquid, comprising: forming said mixture into a cake; passing said liquid through said cake, whereby the reactive material is gradually removed, and replacing the reactive material removed from the cake by introducing with the liquid a further supply of pulverized material.

In witness that I claim the foregoing I have hereunto subscribed my name this 11th day of June, 1928.

HUGH HARLEY CANNON.